United States Patent
Fujita

(10) Patent No.: US 6,624,933 B2
(45) Date of Patent: Sep. 23, 2003

(54) FRONT FACEPLATE USED IN REAR PROJECTION TYPE SCREEN, FRONT-FACEPLATE-EQUIPPED LENTICULAR LENS SHEET, AND REAR PROJECTION TYPE SCREEN

(75) Inventor: Katsuhiro Fujita, Niigata (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/032,553

(22) Filed: Jan. 2, 2002

(65) Prior Publication Data
US 2002/0131169 A1 Sep. 19, 2002

(30) Foreign Application Priority Data
Jan. 15, 2001 (JP) .......................... 2001-006177

(51) Int. Cl.$^7$ .................... G03B 21/56; G03B 21/60
(52) U.S. Cl. ...................... 359/456; 359/460
(58) Field of Search ................. 359/453, 443, 359/456, 457, 460

(56) References Cited

U.S. PATENT DOCUMENTS

| | | | | | |
|---|---|---|---|---|---|
| 3,712,707 A | * | 1/1973 | Henkes, Jr. | ................. | 359/453 |
| 5,675,435 A | * | 10/1997 | Ishii et al. | ................. | 359/460 |
| 5,760,955 A | * | 6/1998 | Goldenberg et al. | ........ | 359/456 |
| 6,271,965 B1 | * | 8/2001 | Miyata | ....................... | 359/453 |
| 6,466,368 B1 | * | 10/2002 | Piepel et al. | ................ | 359/456 |

FOREIGN PATENT DOCUMENTS

| JP | 7-168282 | 7/1995 |
|---|---|---|
| JP | 11-271510 | 10/1999 |

* cited by examiner

*Primary Examiner*—Christopher Mahoney
(74) *Attorney, Agent, or Firm*—Oblon, Spivak, McClelland, Maier & Neustadt, P.C.

(57) ABSTRACT

A front faceplate used in a rear projection type screen is disclosed. The front faceplate have a diffusing layer in a region prescribed distances away from each of a light-entering surface and a light-exiting surface of the front faceplate. The light-entering surface of the front faceplate is a mirror surface. Also, the distance of the diffusing layer from the light-exiting surface is greater than the distance of the diffusing layer from the light-entering surface.

5 Claims, 4 Drawing Sheets

(a)

(b)

(a)

(b)

FRONT FACEPLATE USED IN REAR PROJECTION TYPE SCREEN, FRONT-FACEPLATE-EQUIPPED LENTICULAR LENS SHEET, AND REAR PROJECTION TYPE SCREEN

BACKGROUND OF THE INVENTION

1. Field of the Invention

The present invention relates to a rear projection type screen used in a rear projection television or the like, and in particular to a front faceplate used in the rear projection type screen.

2. Description of the Prior Art

A rear projection type screen used in a rear projection television or the like generally has a configuration in which two lens sheets are placed on top of one another. Specifically, a Fresnel lens sheet that narrows image light from a CRT or image light that has passed through liquid crystals so as to make the image light be within a certain angular range is placed on the light source side, and a lenticular lens sheet that has a function of spreading out the image light that has passed through the Fresnel lens sheet into a suitable angular range is placed on the observer side.

A schematic perspective view of a rear projection type screen is shown in FIG. 6. As shown in FIG. 6, the rear projection type screen is basically composed of a front faceplate 1, a lenticular lens sheet 2 and a Fresnel lens sheet 3. There are disclosures concerning the front faceplate 1 in, for example, Japanese Patent Application Laid-open No. H08-22077 and Japanese Patent Application Laid-open No. H07-307912. The front faceplate 1 is provided for purposes such as protecting the lenticular lens sheet and obtaining a surface glossiness similar to that of a normal cathode ray tube type television.

Lenticular lenses 21 are provided on the surface of the lenticular lens sheet 2 from which the image light enters (hereinafter referred to as the 'light-entering surface'). Of the surface of the lenticular lens sheet 2 from which the image light exits (hereinafter referred to as the 'light-exiting surface'), convergence parts 22 where light from the lenticular lenses 21 formed on the light-entering surface of the lenticular lens sheet 2 is converged are generally formed in convex lens shapes. Non-convergence parts 23 where light from the lenticular lenses 21 formed on the light-entering surface of the lenticular lens sheet 2 does not converge (i.e. parts other than the convergence parts 22) are made to have a projecting shape with a summit portion thereof parallel to the lenticular lens sheet 2. An external light absorbing layer 24 comprising a black coating or the like is provided on the summit portion of each projecting part and on the portions of the side surfaces of each projecting part close to the summit portion (i.e. the upper portions of the side surfaces), thus forming external light absorbing parts 25.

A method of improving color shift and visual field angle in such a rear projection type screen is proposed in Japanese Patent Application Laid-open No. H07-248537. Disclosed in that document are a lenticular lens sheet not containing a diffusing agent, and a front faceplate for which the surface thereof on the light-exiting side (i.e. the side of the observer) is made to be a mirror surface and which has a diffusing layer containing a diffusing agent on the light-entering surface thereof on the side of the lenticular lens sheet. FIG. 7 shows a sectional view of such a conventional rear projection type screen. As shown in FIG. 7, there is a diffusing layer containing a diffusing agent 4 on the light-entering surface of the front faceplate 1.

In the case of a rear projection type screen having the structure disclosed in the above document, a wrinkly shape, i.e. a roughness consisting of small undulations, occurs on the light-entering surface of the front faceplate due to the influence of the diffusing agent, leading to the problem of an increase in reflection of external light and hence a reduction in contrast.

In the case of the conventional art, there is thus a problem that, if a diffusing layer is provided on the light-entering surface of the front faceplate to improve the color shift and the visual field angle, then the contrast is reduced.

SUMMARY OF THE INVENTION

In view of the foregoing, it is an object of the present invention to provide a front faceplate used in a rear projection type screen and a front-faceplate-equipped lenticular lens sheet, for which color shift and visual field angle are improved with no reduction in contrast.

It is another object of the present invention to provide a rear projection type screen for which color shift and visual field angle are improved with no reduction in contrast.

According to one aspect of the present invention, for achieving the above-mentioned object, there is provided a front faceplate used in a rear projection type screen, which have a diffusing layer in a region prescribed distances away from each of a light-entering surface and a light-exiting surface of the front faceplate.

Consequently, color shift and visual field angle are improved with no reduction in contrast.

Also, the lenticular lens sheet is bonded to the front faceplate at summit portions of projecting external light absorbing parts of the lenticular lens sheet. Consequently, a part of the external light is absorbed at the bonding portion, resulting in it being possible to improve the external light contrast.

According to another aspect of the present invention, there is provided a rear projection type screen, comprising the above mentioned front faceplate, a lenticular lens sheet that is bonded to the front faceplate at summit portions of projecting external light absorbing parts of the lenticular lens sheet, and a Fresnel lens sheet positioned on the side of the surface of the lenticular lens sheet opposite to the surface of the lenticular lens sheet bonded to the front faceplate.

Consequently, color shift and visual field angle are improved with no reduction in contrast.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

First Embodiment

Figure 7:
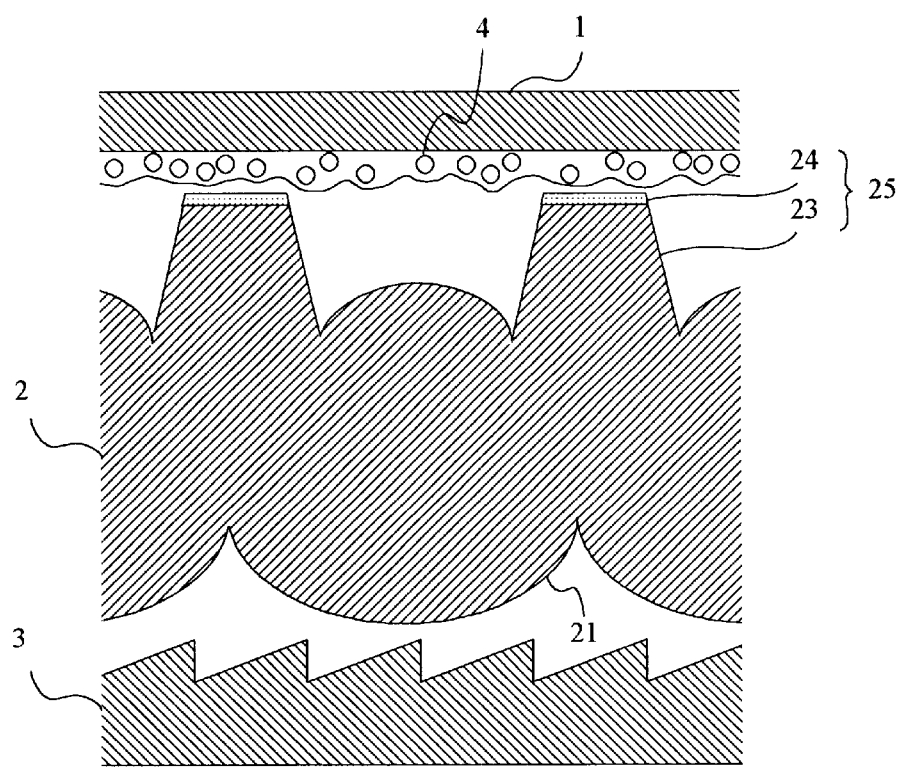
FIG. 7 shows a sectional view of such a conventional rear projection type screen.
Figure 6:
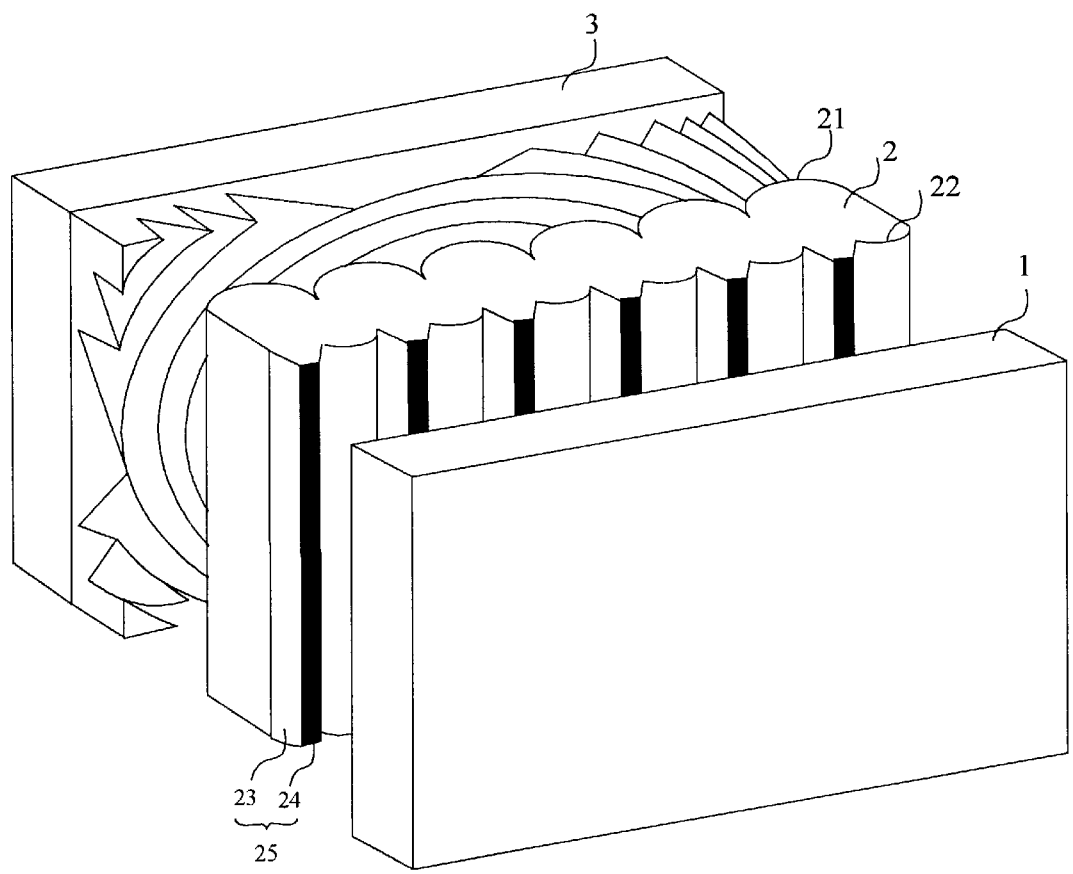
FIG. 6 shows a schematic perspective view of a rear projection type screen.

As shown in FIGS. 6 and 7, the rear projection type screen according to a first embodiment of the present invention comprises at least a front faceplate 1, a lenticular lens sheet 2 and a Fresnel lens sheet 3. As explained using FIG. 6, the lenticular lens sheet 2 has a plurality of lenticular lenses 21 on one surface of a light-transmitting substrate, has convex lens parts 22 on the other surface of the light-transmitting substrate in the positions of convergence of light (the light convergence points or the vicinities thereof) from the lenticular lenses 21, and has projecting external light absorbing parts 25, each provided with an external light absorbing layer 24 on a summit portion thereof, on the above-mentioned other surface of the light-transmitting substrate in positions other than the positions of convergence of light from the lenticular lenses 21. Moreover, the front faceplate 1 and the lenticular lens sheet 2 are bonded together into a single body using a black adhesive at the summit portions of the projecting external light absorbing parts 25. The front faceplate 1 has a diffusing layer, and hence it is not necessary for the lenticular lens sheet 2 to contain a diffusing agent, although the lenticular lens sheet 2 may contain a diffusing agent. Note, however, that even if the lenticular lens sheet 2 does contain a diffusing agent, the amount of the diffusing agent can be reduced compared with conventionally. If a diffusing agent is put into the lenticular lens sheet 2, then a problem will arise in that part of the diffused light exiting the lenticular lens sheet 2 will be blocked by the external light absorbing parts, but by reducing the amount of the diffusing agent, the amount of light blocked by the external light absorbing parts can be reduced, and hence the efficiency of light usage can be increased.

Figure 1:
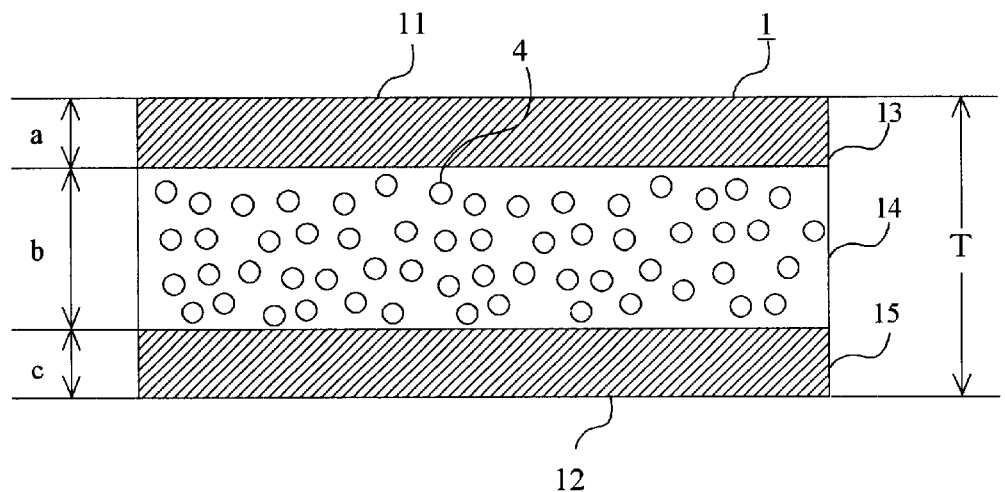
FIG. 1 shows a sectional view of the front face plate 1 according to the present first embodiment.

FIG. 1 is a sectional view of the front faceplate 1 according to the present first embodiment. The front faceplate 1 has a three-layer structure comprising a first layer 13 on the side of a light-exiting surface 11, i.e. the side of an observer, an intermediate layer 14, and a second layer 15 on the side of a light-entering surface 12. The light-exiting surface 11 of the front faceplate 1 is made to be a highly smooth, flat mirror surface. As a result, the observer obtains a sensation of sharpness, and moreover there is an effect of reflecting external light from ceiling lighting and the like diagonally downwards, resulting in this external light not being reflected to the observer and hence in it being possible to improve the external light contrast.

Moreover, the light-entering surface 12 of the front faceplate 1 is also made to be a highly smooth, flat mirror surface. As a result, reflection of external light can be reduced, and hence the external light contrast can be improved.

The base material of each of the first layer 13, the intermediate layer 14 and the second layer 15 is a transparent resin such as a PMMA (polymethyl methacrylate), an MS (a copolymer of methyl methacrylate and styrene) or a PC (polycarbonate). The three layers may be composed of different resins, or may all be composed of the same resin.

A diffusing agent 4 is mixed into the intermediate layer 14. The diffusing agent 4 comprises fine particles, such as fine resin particles made, for example, of a crosslinked copolymer comprising methyl methacrylate, an alkyl acrylate, styrene and a polyfunctional (meth) acrylate or the like, fine inorganic particles made, for example, of glass, or the like; the particles have a different refractive index to the base material, and an average particle diameter of about 1 to 20 $\mu$m.

Figure 2:
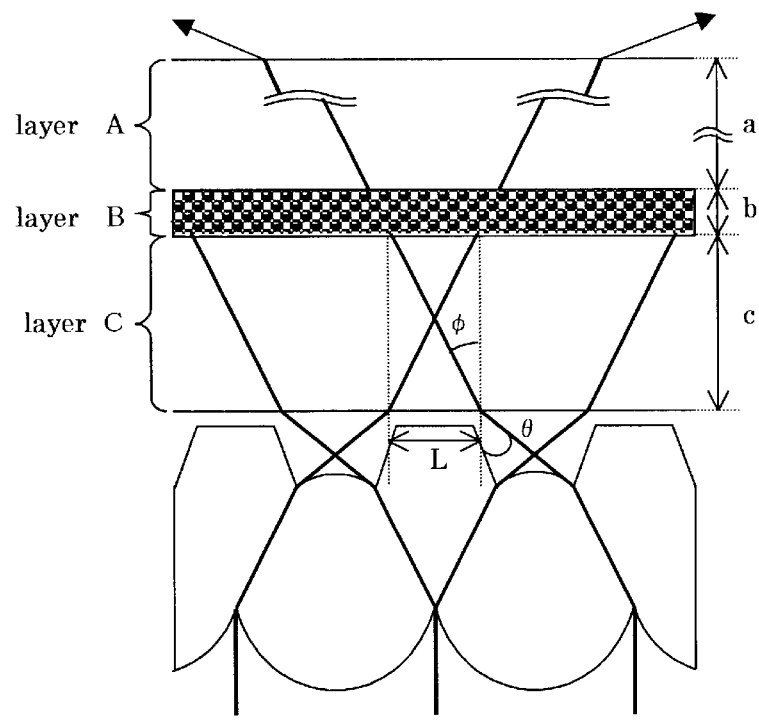
FIG. 2 shows a sectional view of the front faceplate 1 according to the present first embodiment.
Figure 2:
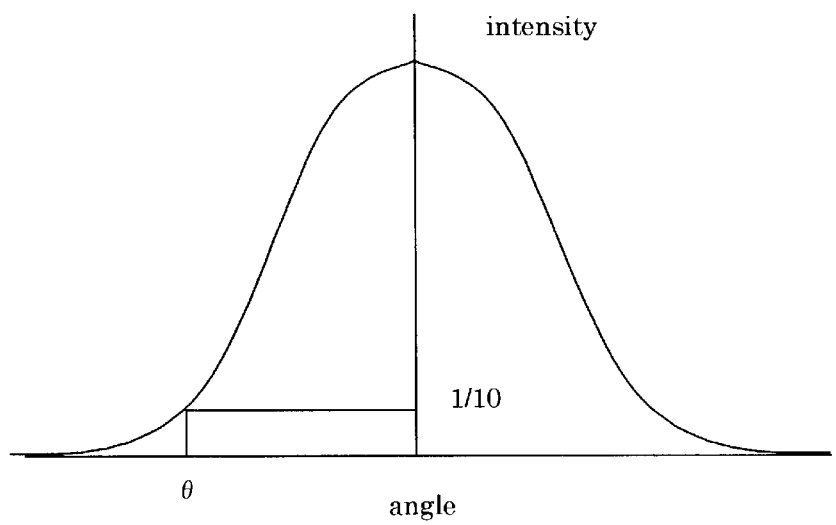

The thickness T of the front faceplate 1 according to the present first embodiment is preferably 1 mm $\leq$ T $\leq$ 5.0 mm. It is preferable for the thickness a of the first layer 13 and the thickness c of the second layer 15 to be a>c, i.e. for the intermediate layer 14 (the diffusing layer) to be closer to the light-entering surface 12. This is because the diffusing layer being closer to the light-entering surface leads to a drop in the resolution being prevented. In this regard, more detail explanation is following by referring to FIG. 2. In order to prevent the drop in the resolution caused by the overlap of the adjacent lights on the interface of the light-exiting surface of the diffusing layer 14, the distance c of the diffusing layer from the light-entering surface should satisfy the following expressions (I) and (II).

$$c < L/\tan \phi \tag{I}$$

$$\sin \theta = n \sin \phi \tag{II}$$

Here, L represents a minimum distance between the positions where the light, which is emitted from the adjacent lenticular lenses 21 and travels nearest to one another, enters the front faceplate 1 as shown in FIG 2(a). $\phi$ represents an angle of incidence of the light, which is emitted from the adjacent lenticular lenses and travels nearest to one another, to the light-entering surface of the front faceplate wherein angle $\theta$ corresponds to light having a 10% of maximum intensity of the light as shown in FIG. 2(b). n represents a refractive index of the layer of the light-entering side of the front faceplate 1.

On the other hand, it is preferable that the minimum thickness of the layer C is greater than the average particle diameter of the fine particle of the diffusing agent 4 in the layer B by taking the smoothness of the light-entering surface into account.

When the front faceplate 1 according to the present first embodiment is bonded to the lenticular lens sheet 2 via the summit portions of the projecting external light absorbing parts 25 of the lenticular lens sheet 2, the resulting bonded article is combined with the Fresnel lens sheet 3 to form the rear projection type screen, and image light is projected onto the rear projection type screen, because minute undulations caused by a diffusing agent do not exist on the light-entering surface of the front faceplate 1, reflection of external light is reduced, and hence the contrast is improved. Moreover, because there is a diffusing layer inside the front faceplate 1 itself, the color shift and the visual field angle are improved compared with when a diffusing layer is provided on the lenticular lens sheet 2.

Second Embodiment

Figure 3:
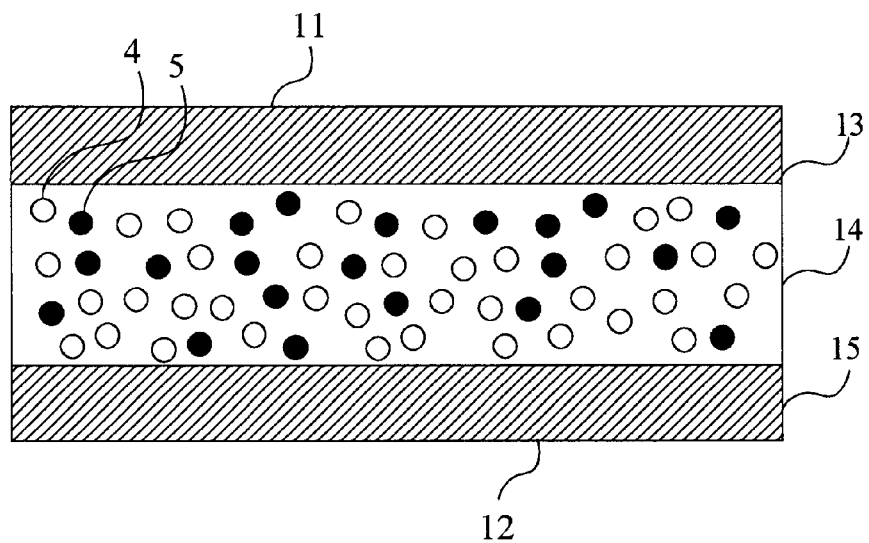
FIG. 3 shows a sectional view of the front faceplate according to a second embodiment of the present invention.
Figure 4:
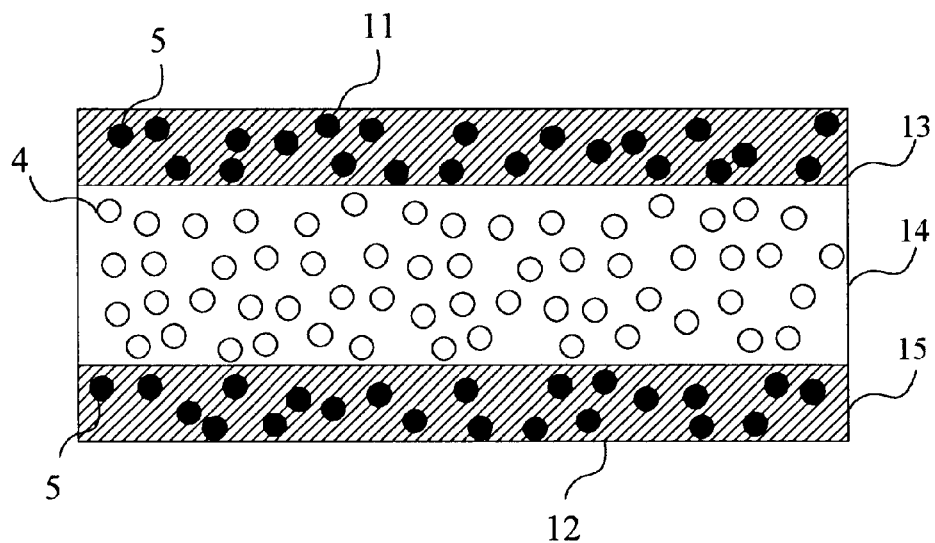
FIG. 4 shows a sectional view of the front faceplate according to a second embodiment of the present invention.

A sectional view of the front faceplate according to a second embodiment of the present invention is shown in FIG. 3. The front faceplate 1 according to the present second embodiment is such that the diffusing agent 4 and a light absorbing agent 5 are mixed into the intermediate layer 14. The light absorbing agent 5 is included to raise the contrast. Reflected light passes through the intermediate layer 14 twice, and hence is absorbed by the light absorbing agent 5 more than normal transmitted light (which passes through the intermediate layer 14 only once). The contrast is raised based on this principle. The light absorbing agent 5 may alternatively be mixed into only the first layer 13 and the second layer 15 as shown in FIG. 4, or into only the first layer 13, only the intermediate layer 14, or only the second layer 15. Moreover, the light absorbing agent 5 may be mixed into all of the first layer 13, the intermediate layer 14 and the second layer 15.

Third Embodiment

Figure 5:
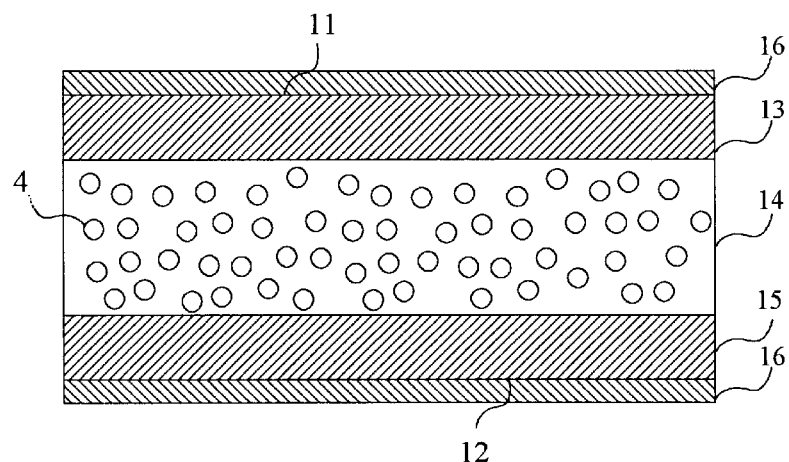
FIG. 5 shows a sectional view of the front faceplate according to a third embodiment of the present invention.

A sectional view of the front faceplate according to a third embodiment of the present invention is shown in FIG. 5. In the case of the front faceplate 1 according to the present third embodiment, an antireflection layer 16 is provided on each of the light-exiting surface 11 and the light-entering surface 12. Moreover, in the case of the front faceplate 1 according to the present third embodiment, the first layer 13 and the second layer 15 are each composed of a resin having a high refractive index. As a result, the antireflection effects can be improved. Note also that it is possible to carry out desired surface treatment such as hard coating treatment or antistatic treatment on at least the light-exiting surface of the front faceplate 1. Further, it is possible to bond a functional film on the surface of the front faceplate 1. The functional film is carried out the desired treatment such as the hard coating treatment, antistatic treatment or antireflection treatment.

EXAMPLE 1

The present invention will now be described in detail through an example. The front faceplate 1 according to the present example had a configuration as shown in FIG. 1, with the thickness T of the front faceplate 1 being made to be 2.1 mm, the thickness a of the first layer 13 1.9 mm, the thickness b of the diffusing layer (the intermediate layer 14) 0.1 mm, and the thickness c of the second layer 15 0.1 mm.

A conventional article for comparison with the above example was made having a structure as shown in FIG. 6, with a diffusing layer containing a diffusing agent 4 being provided on the light-entering surface of the front faceplate 1. The thickness of the front faceplate 1 (including the thickness of the diffusing layer) of the conventional article was 2.0 mm, and the thickness of the diffusing layer was 0.1 mm.

In the case of the conventional article, it was found that external light was scattered at the interface with the diffusing layer provided on the light-entering surface of the front faceplate 1, but by making the light-entering surface be a mirror surface as in the working example, it was possible to suppress irregular reflection and hence reduce reflection of external light. Comparing the external light reflection brightness on the screen when 400 lx of external light was irradiated onto the screen in the case of the conventional article and the working example, for which the diffusing agent concentration had been adjusted such that the color shift and the visual field angle were about the same for the two, the value was 9.6 cd/m² for the conventional article, but 6.7 cd/m² for the working example. It was thus possible to reduce the external light reflection brightness by about 30% for the screen in the case of the working example compared with the conventional article.

EXAMPLE 2

In order to evaluate the front faceplate according to the present invention, the resolution was evaluated by visibility of the external light absorbing parts when an observer observed, by visual evaluation, the front faceplate shown in the following table 1 equipped with the lenticular lens sheet from the side of the front faceplate. The table 1 shows a relationship between the distance c of the diffusing layer from the light-entering surface and the resolution of image on each combination. Here, a minimum value of L was the width l of the external light absorbing part since the front faceplate and the lenticular lens sheet were bonded together in this Example 2.

TABLE 1

| | θ (°) | p (mm) | d (μm) | l (μm) | c (μm) | n | L/tanφ (μm) | resolution |
|---|---|---|---|---|---|---|---|---|
| 1 | 54 | 0.72 | 140 | 320 | 100 | 1.53 | 513 | fine |
| 2 | 54 | 0.72 | 140 | 320 | 1000 | 1.53 | 513 | ordinary |
| 3 | 49 | 0.52 | 170 | 230 | 200 | 1.53 | 406 | fine |

Here, the resolution of "fine" represents the result that the boundary of the external light absorbing part can be clearly identified. The resolution of "ordinary" represents the result that the boundary of the external light absorbing part can be identified but not clear. p represents the pitch of the lenticular lens. d represents the height of the projecting shape of the external light absorbing parts. l represents the width of the external light absorbing part. c represents distance of the diffusing layer from the light-entering surface. n represents a refractive index of the layer of the light-entering side of the front faceplate.

According to the present invention, a front faceplate used in a rear projection type screen, a front-faceplate-equipped lenticular lens sheet, and a rear projection type screen, for which color shift and visual field angle are improved with no reduction in contrast, can be provided.

While preferred embodiments of the present invention have been described using specific terms, such description is for illustrative purposes only, and it is to be understood that changes and variations may be made without departing from the spirit or scope of the following claims.

What is claimed is:

1. A front faceplate used in a rear projection type screen, comprising:

a diffusing layer in a region prescribed distances away from each of a light-entering surface and a light-exiting surface of the front faceplate, said diffusing layer disposed relative to a lenticular lens sheet and set at a distance c from the light-entering surface that satisfies the following expressions:

$c < L/\tan \phi$ $\sin \theta = n \sin \phi$ where L represents a minimum distance between positions where light, which is emitted from adjacent lenticular lenses of the lenticular lens sheet, travel nearest to one another upon entering the front faceplate, φ is an angle of incidence of said light to the light-entering surface of the front faceplate, angle θ corresponds to light having a 10% of maximum intensity of said light, and n is a refractive index of a layer of the light-entering surface of the front faceplate.

2. The front faceplate according to claim 1, wherein at least the light-entering surface thereof is a mirror surface.

3. The front face plate according to claim 1 or 2, wherein a distance of said diffusing layer from the light-exiting surface is greater than a distance of said diffusing layer from the light-entering surface.

4. A front-faceplate-equipped lenticular lens sheet, comprising:

the front faceplate according to claim 1 or 2; and said lenticular lens sheet bonded to the front faceplate at summit portions of projecting external light absorbing parts of the lenticular lens sheet.

5. A rear projection type screen, comprising:

the front faceplate according to claim 1 or 2;

said lenticular lens sheet bonded to the front faceplate at summit portions of projecting external light absorbing parts of the lenticular lens sheet; and a Fresnel lens sheet positioned on a side of a surface of the lenticular lens sheet opposite to a surface of the lenticular lens sheet bonded to the front faceplate.

* * * * *